United States Patent
Kimura et al.

(10) Patent No.: US 8,600,079 B2
(45) Date of Patent: Dec. 3, 2013

(54) AMPLIFIER CIRCUIT OF CAPACITOR MICROPHONE

(75) Inventors: Yasuyuki Kimura, Moriguchi (JP); Masahito Kanaya, Ota (JP); Takashi Tokano, Ota (JP)

(73) Assignees: SANYO Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 430 days.

(21) Appl. No.: 12/753,510

(22) Filed: Apr. 2, 2010

(65) Prior Publication Data

US 2010/0254544 A1  Oct. 7, 2010

(30) Foreign Application Priority Data

Apr. 3, 2009  (JP) ................................ 2009-090880

(51) Int. Cl.
*H04R 3/00* (2006.01)
*H04R 25/00* (2006.01)

(52) U.S. Cl.
USPC .............. 381/111; 381/95; 381/174; 381/175

(58) Field of Classification Search
USPC .......................................... 381/111, 113, 95
See application file for complete search history.

(56) References Cited

U.S. PATENT DOCUMENTS

| | | | |
|---|---|---|---|
| 6,870,938 B2* | 3/2005 | Takeuchi et al. | 381/175 |
| 7,756,279 B2* | 7/2010 | Deruginsky et al. | 381/95 |
| 7,978,863 B2* | 7/2011 | Kuiri | 381/111 |
| 2003/0052699 A1 | 3/2003 | Lasalandra et al. | |
| 2005/0089180 A1* | 4/2005 | Saeki et al. | 381/174 |
| 2009/0110213 A1* | 4/2009 | Holzmann | 381/95 |
| 2009/0116662 A1* | 5/2009 | Wu | 381/94.2 |

FOREIGN PATENT DOCUMENTS

| | | |
|---|---|---|
| EP | 1096831 A2 | 5/2001 |
| JP | 2001-102875 | 4/2001 |
| JP | 2003-177142 | 6/2003 |
| JP | 2008153981 | 7/2008 |

* cited by examiner

*Primary Examiner* — Mohammad Islam
*Assistant Examiner* — David Ton
(74) *Attorney, Agent, or Firm* — Morrison & Foerster LLP

(57) ABSTRACT

The invention provides an amplifier circuit of a capacitor microphone of which the noise resistance against noise of a supply voltage is enhanced. In an amplifier circuit of a capacitor microphone of the invention, while a noise component of a supply voltage is applied to one inversion input terminal of an operational amplifier of an amplification portion through a parasitic capacitor existing between an external power supply wiring and an external wiring that are adjacent to each other, the problem noise component of the supply voltage is applied to the other non-inversion input terminal by capacitive coupling to an internal power supply wiring. Therefore, the noise component is cancelled at the operational amplifier.

6 Claims, 5 Drawing Sheets

AMPLIFIER CIRCUIT OF CAPACITOR MICROPHONE

CROSS-REFERENCE OF THE INVENTION

This application claims priority from Japanese Patent Application No. 2009-090880, the content of which is incorporated herein by reference in its entirety.

BACKGROUND OF THE INVENTION

1. Field of the Invention

The invention relates to an amplifier circuit of a capacitor microphone generating an electric signal corresponding to sound.

2. Description of the Related Art

A MEMS microphone is receiving attention as a type of capacitor microphone in recent years. The fundamental structure of this MEMS microphone is a capacitor made of two electrode plates, i.e., a diaphragm and a back plate that are closely faced and disposed, and this structure is formed on a silicon substrate by a MEMS (Micro Electro Mechanical Systems) technique. This MEMS microphone is resistant to a temperature in a normal solder reflow process, and may be soldered on a printed board together with other components, for example. The MEMS microphone may be formed smaller than a general electret capacitor microphone (ECM). For this reason, a device with the MEMS microphone achieves high packaging density and miniaturization.

While the ECM uses an electret element that stores electric charge semipermanently and thus does not need a bias voltage, the MEMS microphone needs a relatively high direct current bias voltage for operation. By applying this bias voltage, a constant electric charge Q is charged in the capacitor forming the MEMS microphone. When the diaphragm vibrates by sound pressure in this state, the capacitance C of the capacitor changes to change a voltage V between the terminals. This change of the voltage V is outputted as a sound signal.

An amplifier circuit of a MEMS microphone is described in Japanese Patent Application No. 2008-153981, as formed using a charge pump circuit as a bias voltage generation source and an operational amplifier as a signal amplification portion. An amplifier circuit of an electret capacitor microphone (ECM) is described in Japanese Patent Application No. 2001-102875.

However, in a case of an amplifier circuit of a capacitor microphone built in a mobile phone, noise by a burst signal may enter the power supply wiring etc, and this noise may be mixed in a signal from the capacitor microphone and inputted to the operational amplifier. Then the noise from the power supply wiring etc is also amplified together with the signal and outputted, causing a problem of degrading the noise characteristic of the amplifier circuit.

Furthermore, in an amplifier circuit of a conventional MEMS microphone, noise of the charge pump circuit provided as a bias voltage generation source may be mixed in a signal from the MEMS microphone and inputted to the operational amplifier. Then similarly, the noise of the charge pump circuit is also amplified together with the signal and outputted, causing a problem of degrading the noise characteristic of the amplifier circuit.

SUMMARY OF THE INVENTION

The invention provides an amplifier circuit of a capacitor microphone. The circuit includes a capacitor microphone generating a signal corresponding to a sound received by the capacitor microphone, an operational amplifier having a first input terminal, a second input terminal and a output terminal, an input capacitor connected to the second input terminal, a first wiring connecting the first input terminal and the capacitor microphone, a second wiring connecting the second input terminal and the input capacitor, a feedback capacitor connected between the output terminal and the first input terminal, a third wiring supplying a supply voltage, and a coupling capacitor connected between the second wiring and the third wiring so as to be connected to the second input terminal. The operational amplifier is configured to amplify the signal generated by the capacitor microphone, the noise in the power supply voltage is induced in the first wiring through parasitic capacitance coupling between the first wiring and the third wiring and enters the first input terminal, and the coupling capacitor is configured to cancel out the noise entering the first input terminal and the noise entering the second input terminal.

The invention also provides an amplifier circuit of a capacitor microphone. The circuit includes a bias circuit generating a bias voltage, and a capacitor microphone having a first terminal and a second terminal. The first terminal receives the bias voltage, and the second terminal generates a signal corresponding to a sound received by the capacitor microphone. The circuit also includes an input capacitor connected to the bias circuit, and an operational amplifier having a first input terminal, a second input terminal and a output terminal. The first input terminal is connected to the second terminal of the capacitor microphone, and the second input terminal is connected to the input capacitor so as to receive the bias voltage through the input capacitor. The circuit further includes a feedback capacitor connected between the output terminal and the first input terminal of the operational amplifier. The operational amplifier is configured to amplify the signal generated by the capacitor microphone, a noise is superposed on the bias voltage, and the input capacitor is configured to cancel out the noise entering the first input terminal and the noise entering the second input terminal.

DETAILED DESCRIPTION OF THE INVENTION

An amplifier circuit of a capacitor microphone of a first embodiment of the invention will be described referring to FIGS. 1 to 4.

A time-division multiplexing radio communication method such as GSM (Global System for Mobile Communication) etc is often used for a mobile phone. In this radio communication method, a carrier wave is modulated into a burst signal of 217 Hz by a modulator and emitted. The frequency of the modulated carrier wave is generally 0.8 GHz to 1.9 GHz.

At this time, a supply voltage Vdd supplied to an amplifier circuit of a capacitor microphone built in a mobile phone easily changes into a square wave corresponding to the burst signal of the carrier wave. Therefore, such a circuit block to which a supply voltage Vdd is supplied need be resistant to such a change of power supply (noise).

Figure 1:
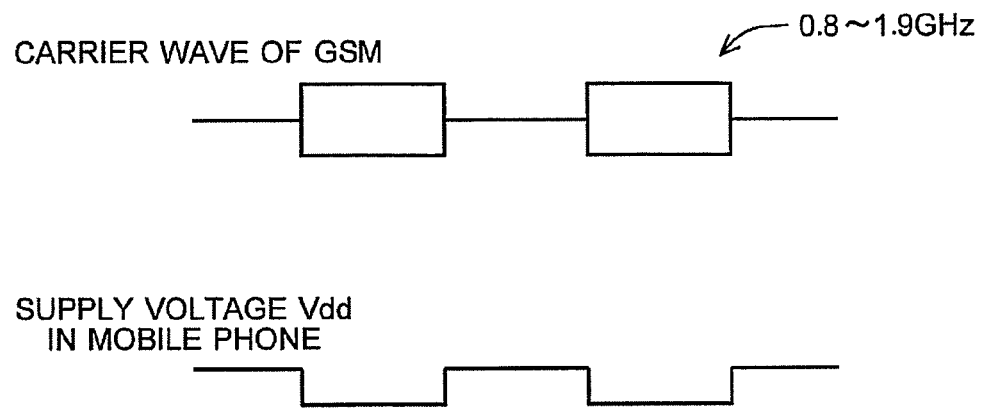
FIG. 1 is a diagram for explaining a change of a supply voltage in a mobile phone.
Figure 2:
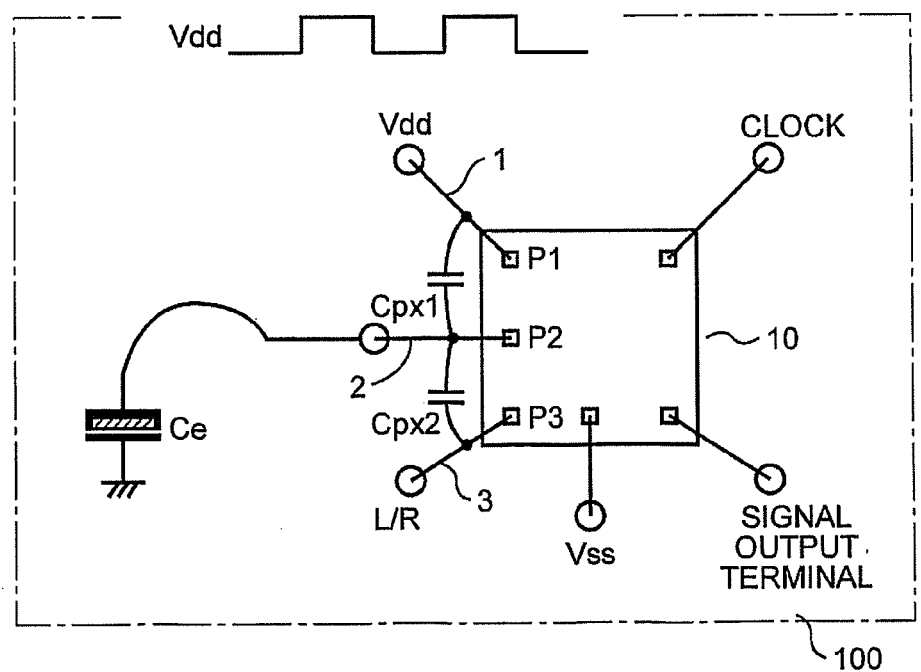
FIG. 2 is a diagram showing an amplifier circuit of a capacitor microphone built in a mobile phone.

FIG. 2 is a diagram showing an amplifier circuit of a capacitor microphone built in a mobile phone 100, and this is made of an electret capacitor microphone Ce and an amplification portion 10 configured as an LSI die. An external power supply wiring 1 (a wiring on the outside of the LSI die, e.g., a bonding wire) that supplies a supply voltage Vdd is connected to a terminal P1 of the amplification portion 10 (a pad electrode inside the LSI).

A capacitor Ce as an electret capacitor microphone is provided on a printed board on the outside of the LSI die, and this is connected to a terminal P2 of the amplification portion 10 through an external wiring 2. In this case, a voltage change (noise) of the supply voltage Vdd enters an input terminal of the operational amplifier of the amplification portion 10 through a parasitic capacitance Cpx1 existing between the external power supply wiring 1 and the external wiring 2 that are adjacent to each other (a parasitic capacitance between wirings).

Furthermore, an L/R control signal (a control signal for selecting an L (left) output or a R (right) output of a stereo) is inputted to the LSI die through an external wiring 3 and a terminal P3. For example, the L output is selected when the L/R control signal is H level (=the supply voltage Vdd) and the R output is selected when the L/R control signal is L level (=the ground voltage Vss). When the L/R control signal is H level (=the supply voltage Vdd), a voltage change (noise) of the supply voltage Vdd also occurs in the external wiring 3, and enters the input terminal of the operational amplifier of the amplification portion 10 through a parasitic capacitance Cpx2 existing between the external wirings 2, 3 that are adjacent to each other.

It is noted that the ground voltage Vss, a clock, etc are also supplied to the LSI die and the output signal of the amplification portion 10 is obtained from a signal output terminal.

While the voltage change of the supply voltage Vdd described above is generally solved by providing the supply line of the supply voltage Vdd with a filter or a regulator, the input impedance of the input terminal of the operational amplifier is set high in order to secure an S/N ratio. Therefore, a noise component of the supply voltage Vdd enters the input terminal of the operational amplifier and the noise component is reflected to the output of the operational amplifier.

Therefore, in the embodiment, the capacitor Ce as an electret capacitor microphone is connected to one input terminal of a differential pair operational amplifier, and a problem noise component is applied to the other input terminal by capacitive coupling to the power supply wiring as a noise source, so that the noise component becomes common mode and cancelled on the operational amplifier.

Figure 3:
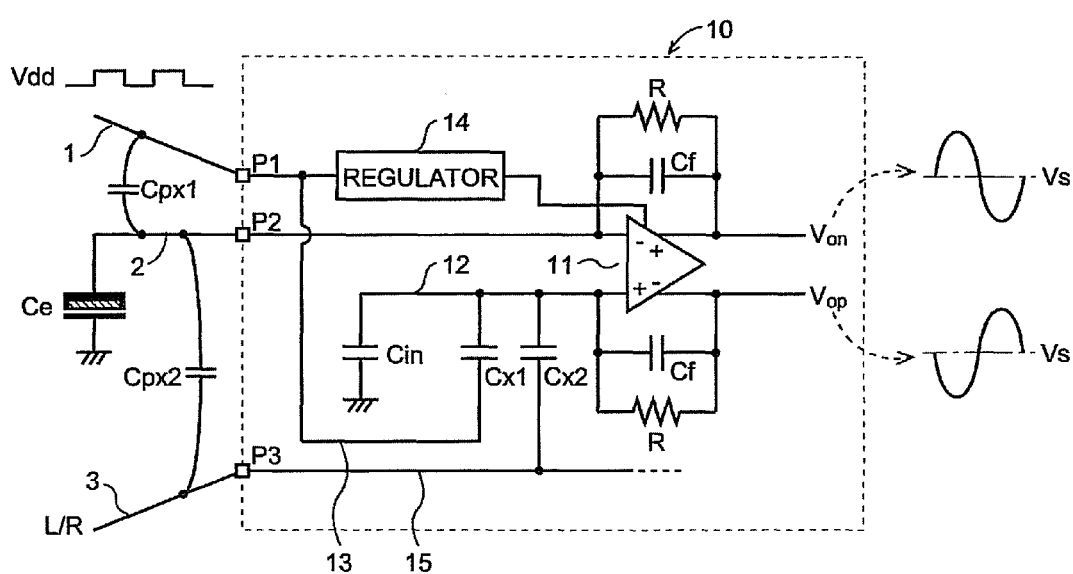
FIG. 3 is a circuit diagram of an amplifier circuit of a capacitor microphone of a first embodiment of the invention.

FIG. 3 is the amplifier circuit of the capacitor microphone of the embodiment. As shown in the figure, the amplifier circuit of the capacitor microphone is made of the capacitor Ce as an electret capacitor microphone and the amplification portion 10.

The amplification portion 10 is configured as one LSI die, in which an operational amplifier 11 is provided. The capacitor Ce is connected to an inversion input terminal (−) of the operational amplifier 11 through a terminal P2 of the LSI die. Then one end of an input capacitor Cin is connected to a non-inversion input terminal (+) of the operational amplifier 11 through an internal wiring 12 of the LSI die. The other end of the input capacitor Cin is grounded. This input capacitor Cin is provided in order to adjust the balance of the waveforms of the output signals Von, Vop of the operational amplifier 11, and the capacitance value CAin of the input capacitor Cin is preferably set equal to the capacitance value CAe of the capacitor Ce, i.e., CAin=CAe so that the waveforms become symmetrical with respect to the center voltage Vs.

Then the internal wiring 12 connected to the non-inversion input terminal (+) of the operational amplifier 11 is capacitively coupled to an internal power supply wiring 13 through a coupling capacitor Cx1 inside the LSI die. The internal power supply wiring 13 is connected to the terminal P1 (a power supply terminal) of the LSI die, and the terminal P1 is connected to the external power supply wiring 1 that supplies the supply voltage Vdd on the outside of the LSI. The capacitance value CAx1 of the coupling capacitor Cx1 is preferably set equal to the capacitance value CApx1 of the parasitic capacitance Cpx1, i.e., CAx1=CApx1, for the same reason as for the capacitance value CAin of the input capacitor Cin.

This operational amplifier 11 has an inversion output terminal (−) and a non-inversion output terminal (+) that are configured to output the output signals Von, Vop as a pair of differential voltage signals inverted with respect to the center voltage Vs. A feedback capacitor Cf and a feedback resistor R are connected in parallel between the non-inversion output terminal (+) and the inversion input terminal (−). Furthermore, in a symmetrical manner, a feedback capacitor Cf and a feedback resistor R are connected in parallel between the inversion output terminal (−) and the non-inversion input terminal (+). As the supply voltage of the operational amplifier 11, a voltage obtained by adjusting the supply voltage Vdd at the terminal P1 by a regulator 14 is supplied, and noise of the supply voltage Vdd is removed by the regulator 14.

The operational amplifier 11 thus has a gain that is determined by CAe/CAf. In order to obtain the gain of 1 or more, CAf is set at a smaller value than CAe. CAe may be a minute value, for example, about several pF, and CAf may be set at a very minute value accordingly.

Since the inversion input terminal (−) and the non-inversion input terminal (+) float when only the capacitor Ce and the feedback capacitor Cf are connected to these and smoothing is hardly expected due to the minute capacitances of these, the potentials of these inversion input terminal (−) and non-inversion input terminal (+) are unstable. Therefore, the feedback resistors R are parallelly connected to feedback routes respectively to which the capacitors Cf are connected, thereby achieving the stability of the potentials of the inversion input terminals (−) and non-inversion input terminal (+).

The feedback resistors R are required to prevent a potential change that occurs in the inversion input terminal (−) and the non-inversion input terminal (+) in response to sound from passing through the feedback resistors R to the inversion output terminal (−) and the non-inversion output terminal (+), and to keep a high output impedance relative to the capacitor Ce. Therefore, the feedback resistors R are set high enough, and are just directly connected between the inversion input terminal (−) and the non-inversion output terminal (+) and between the non-inversion input terminal (+) and the inversion output terminal (−), respectively.

In the amplifier circuit of the capacitor microphone thus configured, while a noise component of the supply voltage Vdd is applied to the inversion input terminal (−) of the operational amplifier 11 of the amplification portion 10 through the parasitic capacitance Cpx1 between the external power supply wiring 1 and the external wiring 2 that are adjacent to each other, the problem noise component of the supply voltage Vdd is applied to the other non-inversion input terminal (+) by the capacitive coupling to the internal power supply wiring 13. Therefore, the noise component is cancelled at the operational amplifier 11.

Furthermore, in a case where the L/R control signal described above is inputted to the LSI die, an internal wiring 15 connected to the terminal P3 inside the LSI die is also capacitively coupled to the internal wiring 12 connected to the non-inversion input terminal (+) of the operational amplifier 11 through a coupling capacitor Cx2.

By this, when the L/R control signal is set at H level (=the supply voltage Vdd), a noise component of the supply voltage Vdd is applied to the non-inversion input terminal (+) through the coupling capacitor Cx2, and thus the noise component is cancelled at the operational amplifier 11. The capacitance value CAx2 of the coupling capacitor Cx2 is preferably set equal to the capacitance value CApx2 of the parasitic capacitance Cpx2, i.e., CAx2=CApx2, for the same reason as for the capacitance value CAin of the input capacitor Cin.

Furthermore, although the amplifier circuit of the capacitor microphone described above outputs two output signals Von, Vop from the operational amplifier 11, the invention is applicable to a structure where the operational amplifier 11 outputs only one output signal Vout.

Figure 4:
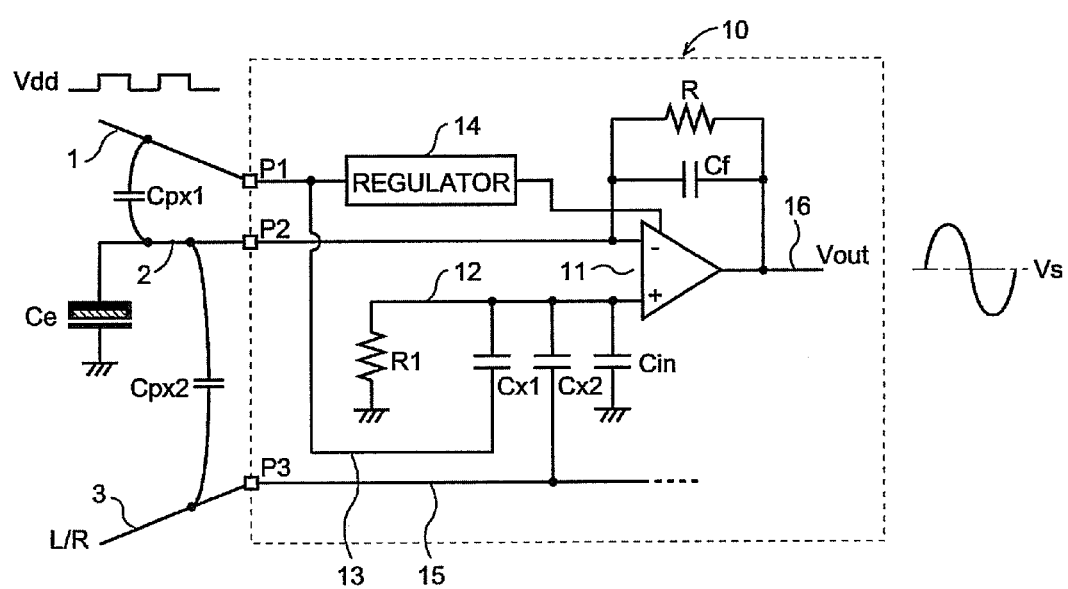
FIG. 4 is a circuit diagram of an amplifier circuit of a capacitor microphone of the first embodiment of the invention.

In detail, as shown in FIG. 4, a feedback capacitor Cf and a feedback resistor R are connected between an output terminal 16 and the inversion input terminal (−) of the operational amplifier 11. The non-inversion input terminal (+) is grounded through a resistor R1. In this case, the resistance value RA1 of the resistor R1 and the resistance value RA of the feedback resistor R are set at the same value (RA1=RA). Furthermore, the input capacitor Cin is connected to the non-inversion input terminal (+), and the capacitance value CAin is preferably set equal to the sum of the capacitance values CAe and CAf (CAM=CAe+CAf). The other structure is the same as that of the circuit of FIG. 3.

Although the capacitor Ce is an electret capacitor microphone that does not need a bias voltage in the circuits of FIGS. 3 and 4, a MEMS microphone that needs a bias voltage may be used instead.

Next, an amplifier circuit of a capacitor microphone of a second embodiment of the invention will be described referring to FIGS. 5 and 6. While the first embodiment solves noise from the outside of an amplifier circuit of a capacitor microphone, this embodiment solves noise superposed on a bias voltage of a bias circuit, i.e., noise from inside an amplifier circuit of a capacitor microphone.

Figure 5:
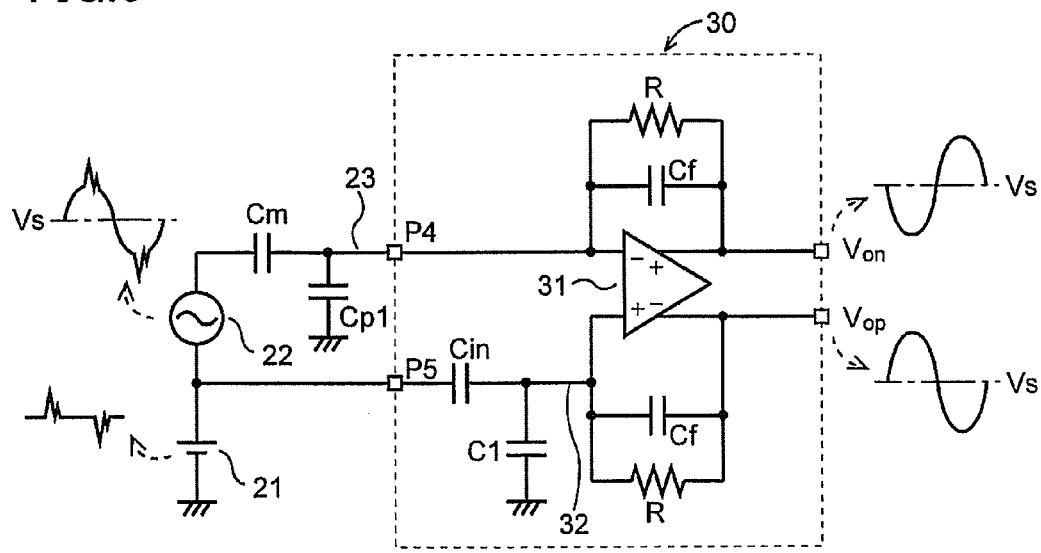
FIG. 5 is a circuit diagram of an amplifier circuit of a capacitor microphone of a second embodiment of the invention.

As shown in FIG. 5, the amplifier circuit of the capacitor microphone is made of a capacitor Cm as a MEMS microphone, a bias circuit 21 generating a bias voltage and an amplification portion 30.

The bias circuit 21 is preferably made of a charge pump circuit generating a high direct current bias voltage by boosting a supply voltage. The charge pump circuit has one or more pumping packet (configured of a charge transfer device such as diode etc and a capacitor) sending an electric charge from a power supply, and this is a circuit that boosts a supply voltage by transferring an electric charge from the power supply to the output terminal in response to a clock applied to the capacitor. A bias voltage of the bias circuit 21 is applied to one end of the capacitor Cm and thereby the capacitor Cm is charged.

In FIG. 5, an input signal source 22 is provided between the capacitor Cm and the bias circuit 21, and this is a sound source equivalently shown on the electric circuit. In actual, the capacitor Cm and the bias circuit 21 are directly connected, and by a change of the capacitance value CAm of the capacitor Cm in response to sound, an electric signal corresponding to the sound is outputted from the other end of the capacitor Cm. Cp1 indicates a parasitic capacitance which a wiring 23 connecting the capacitor Cm to the amplification portion 30 has.

The amplification portion 30 is configured as one LSI die, in which an operational amplifier 31 is provided. The capacitor Cm is connected to an inversion input terminal (−) of the operational amplifier 31 through a terminal P4 of the LSI die. Then the output terminal of the bias circuit 21 (the terminal outputting a bias voltage) is connected to a non-inversion input terminal (+) of the operational amplifier 31 through a terminal P5 and the input capacitor Cin of the LSI die. In this embodiment, noise superposed on a bias voltage of the bias circuit 21 is inputted to both the inversion input terminal (−) and non-inversion input terminal (+) of the operational amplifier 31 and cancelled by each other, and thus the noise is removed from the output of the operational amplifier 31.

C1 is a capacitor coupled to a wiring 32 connecting the input capacitor Cin to the non-inversion input terminal (+) of the operational amplifier 31. The capacitance values CAin and CA1 of the input capacitor Cin and the capacitor C1 are set respectively equal to the capacitance values CAm and Cap1 of the capacitor Cm and the parasitic capacitance Cp1 (CAin=CAm, CA1=CAp1) so that the waveforms of the output signals Von, Vop of the operational amplifier 31 become symmetrical with respect to the center voltage Vs.

This operational amplifier 31 has a non-inversion output terminal (+) and an inversion output terminal (−) that are configured to output the output signals Von, Vop as a pair of differential voltages inverted with respect to the center voltage Vs. A feedback capacitor Cf and a feedback resistor R are connected in parallel between the non-inversion output terminal (+) and the inversion input terminal (−). Furthermore, in a symmetrical manner, a feedback capacitor Cf and a feedback resistor R are connected in parallel between the inversion output terminal (−) and the non-inversion input terminal (+).

The operational amplifier 31 has a gain that is determined by CAm/CAf like in the first embodiment, and in order to obtain the gain of 1 or more, CAf is set at a smaller value than CAm. At this time, CAm may be a minute value, for example, about several pF, and CAf may be set at a very minute value accordingly.

Since the inversion input terminal (−) and the non-inversion input terminal (+) float when only the capacitor Cm and the feedback capacitor Cf are connected to these and smoothing is hardly expected due to the minute capacitances of these, the potentials of these input terminals are unstable. Therefore, the feedback resistors R are parallelly connected to feedback routes respectively to which the capacitors Cf are connected, thereby achieving the stability of the potentials of the input terminals.

The feedback resistors R are required to prevent a potential change that occurs in the inversion input terminal (−) and the non-inversion input terminal (+) in response to sound from passing through the feedback resistors R to the inversion output terminal (−) and the non-inversion output terminal (+), and to keep a high output impedance relative to the capacitor Cm. Therefore, the resistance values RA of the feedback resistors R are set high enough, and the feedback resistors R are just directly connected between the inversion input terminal (−) and the non-inversion output terminal (+) and between the non-inversion input terminal (+) and the inversion output terminal (−), respectively.

In the amplifier circuit of the capacitor microphone thus configured, in a case where noise generated by the bias circuit 21 is superposed on a signal of the capacitor Cm corresponding to sound, the noise is inputted to both the inversion input terminal (−) and non-inversion input terminal (+) of the operational amplifier 31 and thereby cancelled, and thus the noise is removed from the output of the operational amplifier 31. In particular, since the bias circuit 21 easily generates noise when it is made of a charge pump circuit, the invention is particularly effective for this case.

Figure 6:
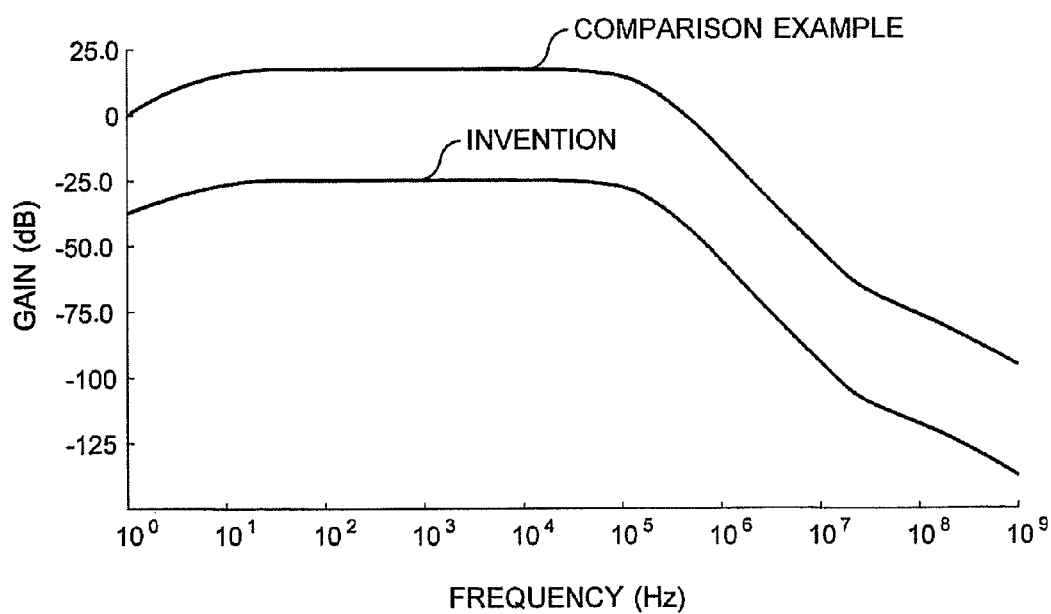
FIG. 6 is a graph of the noise characteristic of the amplifier circuit of the capacitor microphone of the second embodiment of the invention.

FIG. 6 is a graph of the noise characteristic of the amplifier circuit of the capacitor microphone by circuit simulation. In the figure, the axis of abscissas indicates the frequency of noise of the charge pump circuit as the bias circuit 21, and the axis of ordinates indicates the gain of the operational amplifier 31. The gain of the amplifier circuit of the capacitor microphone of the invention relative to noise is lower than that of a circuit in FIG. 7 by 42 dB.

Figure 7:
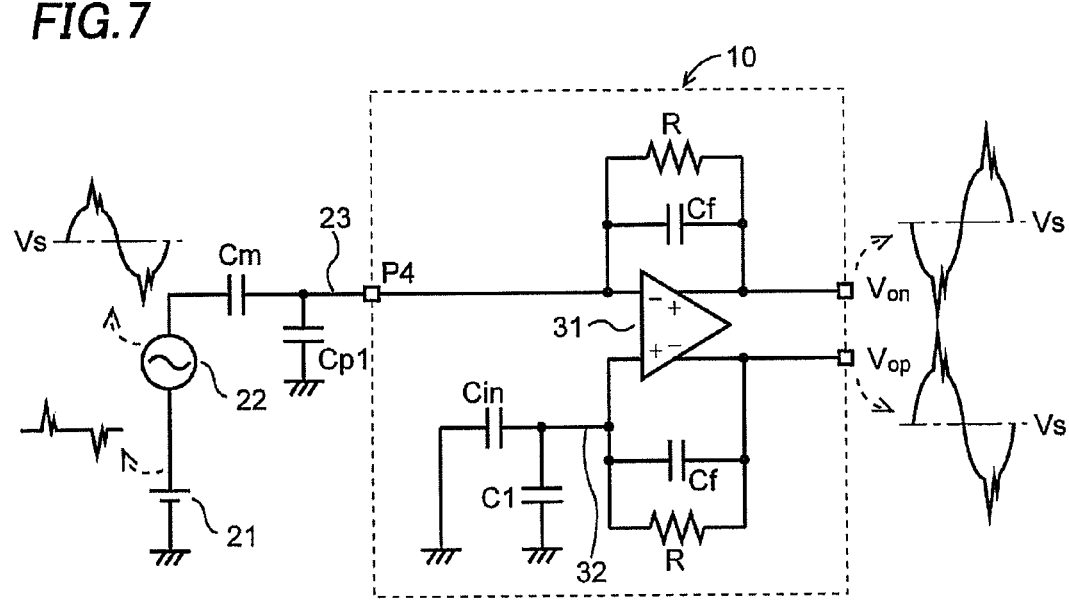
FIG. 7 is a circuit diagram of an amplifier circuit of a capacitor microphone as a comparison example.

The circuit in FIG. 7 is an amplifier circuit of a capacitor microphone as a comparison example, and the ground voltage is applied to the non-inversion input terminal (+) of the operational amplifier 31 through the input capacitor Cin. In this circuit, when noise of the charge pump circuit is superposed on a signal of the capacitor Cm corresponding to sound, the noise is also amplified with the signal of the capacitor Cm and reflected to the output signals Von, Vop of the operational amplifier 31.

In the amplifier circuit of the capacitor microphone of the invention, noise entering from the power supply wiring etc is inputted to both the pair of input terminals of the operational amplifier, and thus the noise is cancelled. As a result, the noise characteristic of the amplifier circuit is improved.

Furthermore, in the amplifier circuit of the capacitor microphone of the invention, noise generated by the bias circuit is inputted to both the pair of input terminals of the operational amplifier, and thus the noise is cancelled. As a result, the noise characteristic of the amplifier circuit is improved.

What is claimed is:

1. An amplifier circuit of a capacitor microphone, comprising:
    a capacitor microphone generating a signal corresponding to a sound received by the capacitor microphone;
    an operational amplifier comprising a first input terminal, a second input terminal and an output terminal;
    an input capacitor connected to the second input terminal;
    a first wiring connecting the first input terminal and the capacitor microphone;
    a second wiring connecting the second input terminal and the input capacitor;
    a feedback capacitor connected between the output terminal and the first input terminal;
    a third wiring supplying a supply voltage; and
    a coupling capacitor connected between the second wiring and the third wiring so as to be connected to the second input terminal,
    wherein the operational amplifier is configured to amplify the signal generated by the capacitor microphone,
    a noise in the power supply voltage is induced in the first wiring through parasitic capacitance coupling between the first wiring and the third wiring and enters the first input terminal,
    the coupling capacitor is configured to cancel out the noise entering the first input terminal and the noise entering the second input terminal,
    the third wiring is connected to the operational amplifier so that neither the first input terminal nor the second input terminal is connected to the third wiring.

2. The amplifier circuit of claim 1, wherein the capacitor microphone is configured to operate with a time-division multiplexing mobile phone.

3. The amplifier circuit of claim 1, wherein a capacitance of the coupling capacitor is equal to a capacitance of parasitic capacitance between the first wiring and the third wiring.

4. An amplifier circuit of a capacitor microphone, comprising:
    a bias circuit generating a bias voltage;
    a capacitor microphone comprising a first terminal and a second terminal, the first terminal receiving the bias voltage and the second terminal generating a signal corresponding to a sound received by the capacitor microphone;
    an input capacitor connected to the bias circuit;
    an operational amplifier comprising a first input terminal, a second input terminal and an output terminal, the first input terminal being connected to the second terminal of the capacitor microphone and the second input terminal being connected to the input capacitor so as to receive the bias voltage through the input capacitor;
    a feedback capacitor connected between the output terminal and the first input terminal of the operational amplifier;
    a first wiring connecting the capacitor microphone and the first input terminal;
    a second wiring connecting the input capacitor and the second input terminal; and
    a coupling capacitor connecting the second wiring and a ground,
    wherein the operational amplifier is configured to amplify the signal generated by the capacitor microphone,
    a noise is superposed on the bias voltage,
    the input capacitor is configured to cancel out the noise entering the first input terminal and the noise entering the second input terminal, and
    a capacitance of the coupling capacitor is equal to a capacitance of parasitic capacitance between the first wiring and the ground.

5. The amplifier circuit of claim 4, wherein the bias circuit comprises a charge pump circuit.

6. The amplifier circuit of claim 4, wherein a capacitance of the input capacitor is equal to a capacitance of the capacitor microphone.

* * * * *